July 19, 1949.   C. W. BERTHIEZ   2,476,799
FRICTION FREE SLIDER RHEOSTAT
Filed April 15, 1947
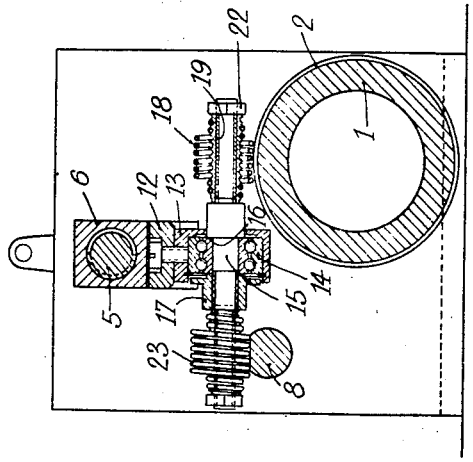
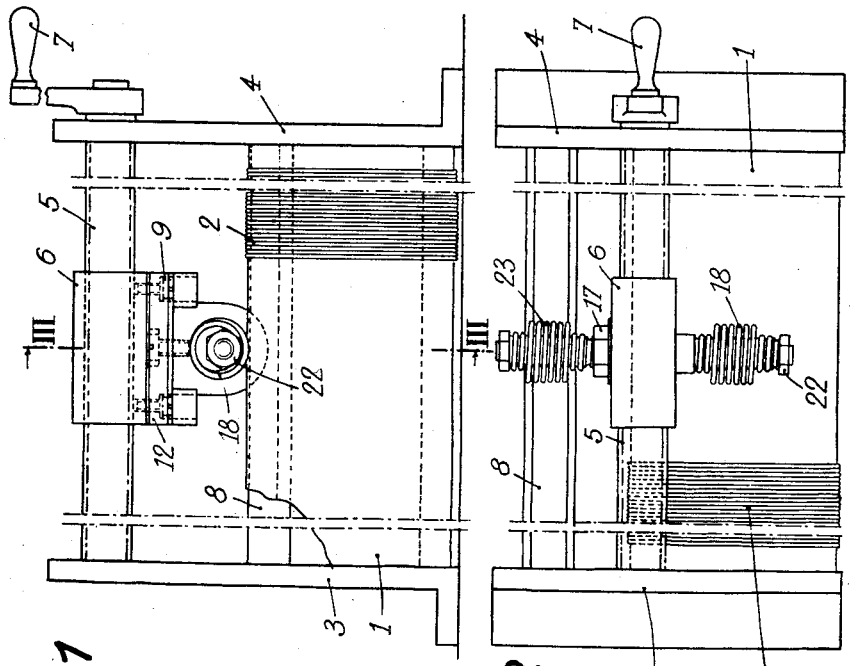
Charles William Berthiez
INVENTOR
By George H. Corey
His Attorney Patented July 19, 1949

2,476,799

UNITED STATES PATENT OFFICE 2,476,799

FRICTION-FREE SLIDER RHEOSTAT

Charles William Berthiez, Paris, France

Application April 15, 1947, Serial No. 741,589
In France April 24, 1946

14 Claims. (Cl. 201—62)

This invention relates to electrical rheostats in which a continuous resistance is utilized with which contact or connection is made at different points therealong to vary the resistance connected in a circuit.

The mechanical rheostats of this kind generally most in demand are of two main types: the rheostats the slider of which moves over contact pieces and those the slider of which moves directly over the convolutions of a wound resistant wire. The former only provide for variation in resistance between two successive contact pieces in comparatively large steps, whereas the latter allow a much more gradual variation but, on the other hand, the slider moves perpendicularly to the direction of the wire and consequently the friction is not that of a snug fit and leads to a wear and sometimes even to a break of the resistant wire.

The rheostat that forms the object of my invention belongs to the second category of rheostats defined hereinabove but does not show their drawbacks by reason of the slider acting without any substantial friction as provided through a special contrivance devised therefor.

According to a first feature of the invention, the slider on the rheostat carries an elastic deformable conductive roller the shape of which matches the general shape of the part of the coiled resistance wire with which it is in contact and which is mounted so as to be capable of rolling over said wire.

Preferably the roller is mechanically and electrically connected with another roller similar to the former and located so as to roll over a collecting bar connected to a terminal of the rheostat.

In the preferred form of my invention, the roller or each roller is constituted by a coiled spring fitted over a rotatable member or spindle carrying it at both ends.

Other features of my invention will appear in the reading of the following description and inspection of accompanying drawings, said description and drawings being given by way of example and not by way of limiting the invention to the form disclosed. In said drawings:

Fig. 1 is an elevational view of a form of a rheostat according to my invention.

Fig. 2 is a corresponding plan view.

Fig. 3 is a cross-section through line III—III of Fig. 1.

Referring to the drawings, it is apparent that the rheostat includes a tube 1 around which the resistant wire 2 is wound in the usual manner between two flanges 3 and 4 that carry also, on the one hand, a control worm or threaded shaft 5 for the slider 6, which worm is provided at one end with a crank 7, and, on the other hand, a current collecting bar 8 parallel with the tube 1 and which will be described with further detail hereinafter.

To the slider 6 is secured by means of two screws 9 an insulating carrier 12, which latter carries in its turn a member 13 holding a ball bearing 14 with two rows of balls, said bearing holding the spindle 15 between a shoulder 16 on said spindle and a nut 17 screwed over the spindle.

According to one of the chief features of my invention, I use as a roller adapted to move over the wound wire 2 a helically wound spring 18 the terminal convolutions of which have a diameter smaller than that of the central convolutions and are held fast on the hub or sleeve 19 screwed over the spindle 15. A safety nut 22 prevents any unscrewing of the hub 19 with reference to the spindle.

At the other end of the spindle 15 is mounted a roller 23 identical with the roller 18 and the general arrangement is such that the assembly of the slider and of the parts carried thereby assumes around the axis of the worm 5 a position of equilibrium that is defined by the torques produced by the reaction stresses of the roller 18 bearing on the coil 2 and of the roller 23 bearing on the rod 8. The relative positioning of the parts is such that the rollers 18 and 23 are slightly compressed respectively against the coil 2 and the rod 8 so as to match the shape of the parts contacting therewith and to ensure thus an excellent contact.

The operation of the rheostat described hereinabove will be easily understood. Rotation of the worm 5 upon its axis under the action of the crank 7 produces a translational movement of the slider 6 along said worm while the rollers 18 and 23 roll over their corresponding parts constituted respectively by the coiled wire 8 of the rheostat and the current collecting bar 2. It is apparent that with such an arrangement the control of the rheostat is an exceedingly smooth and consequently accurate one. Moreover, through the omission of a slider rubbing over the resistant wire the coiled resistant wire is no longer submitted to frictional wear. As on the other hand the contact between the slider and the coiled wire is not obtained merely through one point but through several points, i. e. as many points as there are convolutions of the spring 18 in contact with the coiled wire, there is no wear produced on the resisting wire due to local heating. This provides a very reliable operation of the rheostat and increases considerably its life.

Of course, my invention is not limited to the particular embodiment described and illustrated that has been given merely by way of exemplification. Thus, the springs 18, 23 forming the rollers may assume a general shape different from that illustrated, provided they have sufficient yielding capacity and are preferably in contact with the corresponding part, that is, the coil 2 and the bar 8 over a substantial distance transverse to the movement of the slider 6.

The rollers may moreover be constituted otherwise than by springs, provided they are electrically conductive, deformable and elastic.

Moreover, the rheostat illustrated includes, on the one hand, a coil carrying tube and, on the other hand, a rod, but obviously I would not unduly widen the scope of my invention as defined in accompanying claims by substituting a second tube for the rod, the rollers being electrically connected with the control worm 5 that would then act as current collecting means.

Lastly it is quite obvious that the means for operating the slider 6 may be different from that disclosed hereinabove by way of example.

What I claim is:

1. A rheostat comprising a coil of resistance wire, a roller, means for supporting said roller in relation to said coil for movement thereof in rolling contact therewith transversely successively of the wire of the successive loops of the coil, said roller being electrically conductive and formed as a resilient member capable of yielding as it rolls from loop to loop and of conforming to the contour of the loops of said coil, and means for connecting said roller and said coil in an electric circuit.

2. A rheostat as defined in claim 1 in which the loops of said coil are wound upon and are arranged along a common rectilinear axis, and means for supporting said roller to move transversely of the loops of the coil parallel to said axis.

3. A rheostat as defined in claim 1 in which said roller is provided by a helically wound spring of electrically conductive material, means for supporting said spring for rotation on the axis of the helix extending generally parallel to parallel tangents to the successive loops of the coil with the helix of said spring in rolling contact with said coil successively yieldingly to engage the successive loops of the coil and so that said helix yields to conform to the contour of said loops.

4. A rheostat comprising a coil of resistance wire wound with parallelly arranged loops, a rotatable member, means for supporting said rotatable member for movement thereof transversely successively of the wire of the successive loops of said coil and for rotation on an axis extending generally parallel to the loops of the coil, a helically wound spring of electrically conductive material supported at least at a given portion thereof by and coaxially with said rotatable member for rotation therewith on said axis and providing at another portion thereof for yielding movement of the helix of said spring transversely of said axis, said other portion of the helix of said spring being in yielding rolling contact with said coil as said rotatable member and said spring rotate on said axis and move along said coil, and means for connecting said rotatable member and said spring and said coil in an electric circuit.

5. A rheostat as defined in claim 4 in which said rotatable member is provided with a thread coaxial with the axis of said member, said given portion of said helically wound spring engaging said thread of said rotatable member in threaded relation thereto to provide said support of said spring by said rotatable member.

6. A rheostat as defined in claim 1 in which said means for connecting said roller and said coil in an electric circuit comprises a conductive member having an extent generally parallel to the movement of said rheostat roller, and a second electrically conductive roller supported for movement along and in rolling contact with said conductive member concomitantly with said movement of said rheostat roller.

7. A rheostat as defined in claim 6 in which said second roller is formed as a resilient member capable of yielding as it rolls in contact with said conductive member.

8. A rheostat as defined in claim 4 in which said means for connecting said rotatable member and said helically wound spring and said coil in an electric circuit comprises a helical spring element of electrically conductive material supported at least at a given portion thereof by and coaxially with said rotatable member for rotation therewith on said axis and providing at another portion thereof for yielding movement of the helix of said spring element transversely of said axis, and an electrical conductor having an extent generally parallel to said movement of said rotatable member transversely of said loops of said coil and arranged in relation to said helical spring element for yielding rolling contact of said element along said conductor as said helically wound spring moves in rolling contact with said coil into engagement with successive loops of said coil.

9. A rheostat comprising a coiled resistance wire, means adapted to move transversely of the wire of the coil, a roller formed of a conductive material adapted to provide yielding engagement and rolling contact with said coil, a conductive member connecting said roller and said coil in an electric circuit, a second roller formed of a conductive material adapted to provide yielding engagement and rolling contact with said conductive member, and a common shaft supporting said rollers and supported by said first mentioned means.

10. A rheostat comprising a coiled resistance wire, means adapted to move transversely of the wire of the coil, a roller formed of a conductive material adapted to provide yielding engagement and rolling contact with said coil, a conductive member connecting said roller and said coil in an electric circuit, a second roller formed of a conductive material adapted to provide yielding engagement and rolling contact with said conductive member, and a common shaft supporting said rollers and supported by said first mentioned means between said two rollers for pivotal movement of said shaft and said rollers about an axis in a plane substantially parallel to the loops of said coil.

11. A rheostat as defined in claim 1 which comprises means operatively connected to said roller and operable to effect said movement thereof transversely of the wire of the successive loops of said coil.

12. A rheostat as defined in claim 4 which comprises a screw supported for rotation thereof on its axis and with said axis parallel to said movement of said rotatable member, a traverse member in threaded engagement with said screw for movement thereof along said screw upon rotation of said screw, said traverse member supporting said rotatable member for rotation thereof with said helically wound spring in rolling contact with said coil.

13. A rheostat comprising a coil of resistance wire, a roller, means for supporting said roller in relation to said coil for movement thereof in rolling contact therewith transversely successively of the wire of the successive loops of the coil, said roller being formed to provide a plurality of electrically conductive contact elements adjacently arranged along said roller in the direction parallel to the axis thereof and providing a plurality of contact surfaces each extending circumferentially with respect to said axis to provide for rolling contact of said elements with said coil, said contact elements each being supported in said roller for resilient yielding movement thereof in the direction transversely of the axis of the roller so as to provide a plurality of contacts of said roller along the wire of the respective loops of said coil successively engaged by said roller, and means for connecting said roller and said coil in an electric circuit.

14. A rheostat comprising a coil of resistance wire, a roller, means for supporting said roller in relation to said coil for movement thereof in rolling contact therewith transversely successively of the wire of the succesive loops of the coil, said roller being formed to provide a plurality of electrically conductive elements adjacently arranged along said roller in the direction parallel to the axis thereof and providing a plurality of contact surfaces each extending circumferentially with respect to said axis to provide for rolling contact of said elements with said coil, said contact elements each being formed as a resilient element capable of separately yielding with respect to the other contact elements and adapted as a group to make contact with each loop along the contour thereof at a plurality of contact points, and means for connecting said roller and said elements thereof and said coil in an electric circuit.

CHARLES WILLIAM BERTHIEZ.

REFERENCES CITED

The following references are of record in the file of this patent:

UNITED STATES PATENTS

| Number | Name | Date |
|---|---|---|
| 1,706,570 | Elmwall | Mar. 26, 1929 |
| 2,055,766 | Hunt | Sept. 29, 1936 |

FOREIGN PATENTS

| Number | Country | Date |
|---|---|---|
| 136,425 | Germany | Dec. 26, 1902 |